United States Patent
Ward et al.

(10) Patent No.: US 12,495,048 B1
(45) Date of Patent: Dec. 9, 2025

(54) VALIDATING AN AGENT USED FOR THREAT DETECTION ON A CUSTOMER-CONTROLLED INSTANCE

(71) Applicant: Amazon Technologies, Inc., Seattle, WA (US)

(72) Inventors: Nicolas C Ward, Seattle, WA (US); Karan Hemant Kothari, Seattle, WA (US); Harish Balaji, Seattle, WA (US); Dennis Tighe, Seattle, WA (US); Micah William Hausler, Franklin, TN (US); Kunjan Shridhar Naik, Redondo Beach, CA (US)

(73) Assignee: Amazon Technologies, Inc., Seattle, WA (US)

( * ) Notice: Subject to any disclaimer, the term of this patent is extended or adjusted under 35 U.S.C. 154(b) by 197 days.

(21) Appl. No.: 18/343,581

(22) Filed: Jun. 28, 2023

(51) Int. Cl.
H04L 9/40 (2022.01)

(52) U.S. Cl.
CPC ........ H04L 63/1416 (2013.01); H04L 63/083 (2013.01)

(58) Field of Classification Search
CPC ... H04L 63/20; H04L 63/083; H04L 63/1416; H04L 63/1425; H04L 63/1441; G06F 21/552; G06F 21/53
See application file for complete search history.

(56) References Cited

U.S. PATENT DOCUMENTS

| | | | |
|---|---|---|---|
| 8,375,445 B2 | 2/2013 | Higashikado | |
| 9,256,467 B1 * | 2/2016 | Singh | G06F 9/5055 |
| 9,288,059 B2 | 3/2016 | Nix | |
| 9,413,827 B2 | 8/2016 | Sharma et al. | |
| 9,438,440 B2 | 9/2016 | Burns et al. | |
| 9,508,347 B2 | 11/2016 | Wang et al. | |
| 9,563,854 B2 | 2/2017 | Cruz Mota et al. | |
| 10,193,913 B2 | 1/2019 | Machlica et al. | |
| 10,838,756 B2 * | 11/2020 | Singh | G06F 9/5055 |

(Continued)

FOREIGN PATENT DOCUMENTS

WO 2017140710 8/2017

OTHER PUBLICATIONS

U.S. Appl. No. 15/666,491, filed Aug. 1, 2017, Vineet Shashikant Chaoji et al.

(Continued)

*Primary Examiner* — Hosuk Song
(74) *Attorney, Agent, or Firm* — Alexander A. Knapp; Kowert, Hood, Munyon, Rankin & Goetzel, P.C.

(57) ABSTRACT

Systems and methods for performing agent verification for a threat detection service are disclosed. A request to send telemetry data from an agent on an instance with a customer-controlled container is by an agent verification system. The request may include an instance ID, token, and/or a connection ID. A confirmation is performed that the instance ID of the request matches an instance ID of an instance known to support the customer-controlled container. Also, the token included in the request may be authenticated to verify that the agent is an authentic agent. The connection ID from the request may also be confirmed to match a connection ID for a connection provided to the instance of the instance ID. The request may be accepted, and the threat detection service may be enabled to receive the telemetry data.

20 Claims, 8 Drawing Sheets

(56) References Cited

U.S. PATENT DOCUMENTS

| | | | |
|---|---|---|---|
| 10,904,074 B2* | 1/2021 | Wilson | G06F 21/50 |
| 11,245,682 B2* | 2/2022 | Kukreja | G06F 21/335 |
| 11,356,454 B2* | 6/2022 | Gupta | G06F 21/53 |
| 11,489,853 B2 | 11/2022 | Mehr | |
| 2003/0110252 A1 | 6/2003 | Yang-Huffman | |
| 2006/0200007 A1 | 9/2006 | Brockway et al. | |
| 2009/0307277 A1 | 12/2009 | Grubov et al. | |
| 2010/0332149 A1 | 12/2010 | Scholpp | |
| 2011/0200239 A1 | 8/2011 | Levine et al. | |
| 2012/0005755 A1 | 1/2012 | Kitazawa et al. | |
| 2012/0143020 A1 | 6/2012 | Bordoley et al. | |
| 2012/0208161 A1 | 8/2012 | Takata et al. | |
| 2012/0289790 A1 | 11/2012 | Jain et al. | |
| 2014/0058986 A1 | 2/2014 | Boss et al. | |
| 2014/0266684 A1 | 9/2014 | Poder et al. | |
| 2015/0281401 A1 | 10/2015 | Le et al. | |
| 2016/0050264 A1 | 2/2016 | Breed et al. | |
| 2016/0072891 A1 | 3/2016 | Joshi et al. | |
| 2016/0164678 A1 | 6/2016 | Nix | |
| 2016/0171371 A1 | 6/2016 | Andrejko et al. | |
| 2016/0188292 A1 | 6/2016 | Carter et al. | |
| 2016/0217387 A1 | 7/2016 | Okanohara et al. | |
| 2016/0239749 A1 | 8/2016 | Peredriy et al. | |
| 2016/0358095 A1 | 12/2016 | Dong et al. | |
| 2017/0126704 A1 | 5/2017 | Nandha Premnath et al. | |
| 2018/0285767 A1 | 10/2018 | Chew | |
| 2019/0036716 A1 | 1/2019 | Kasaragod et al. | |
| 2019/0037040 A1 | 1/2019 | Kasaragod et al. | |
| 2019/0037638 A1 | 1/2019 | Kasaragod et al. | |
| 2021/0344690 A1 | 11/2021 | Mehr | |
| 2021/0344726 A1 | 11/2021 | Sharifi Mehr | |
| 2022/0078007 A1* | 3/2022 | Reddem | H04L 63/0815 |
| 2023/0134096 A1* | 5/2023 | Boyapalle | G06N 20/00 718/105 |
| 2024/0211227 A1* | 6/2024 | Johnson | G06F 8/60 |

OTHER PUBLICATIONS

U.S. Appl. No. 15/666,491, filed Aug. 1, 2017, Adolfo Bravo Ferreira.
U.S. Appl. No. 16/456,850, filed Jun. 28, 2019, Craig Lawton et al.
U.S. Appl. No. 16/584,861, filed Sep. 26, 2019, Lomash Kumar et al.
U.S. Appl. No. 16/807,055, filed Mar. 2, 2020, Nima Sharifi Mehr et al.

* cited by examiner

VALIDATING AN AGENT USED FOR THREAT DETECTION ON A CUSTOMER-CONTROLLED INSTANCE

BACKGROUND

Some enterprises implement threat detection services. To implement these threat detection services, telemetry data may be collected either passively or actively. Active telemetry data collection requires permission to collect data from inside a customer-controlled environment. For example, to perform active telemetry data collection, agents may be placed, with customer permission, in the customer-controlled environment. However, such installed agents require configurations on the customer's side to allow telemetry data collection and may be altered in ways that are beyond the control of the threat detection service that is to receive telemetry data from the agents installed in the customer environment.

While embodiments are described herein by way of example for several embodiments and illustrative drawings, those skilled in the art will recognize that embodiments are not limited to the embodiments or drawings described. The drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . " Such a claim does not foreclose the apparatus from including additional components.

"Configured To." Various units, circuits, or other components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on). The units/components used with the "configured to" language include hardware—for example, circuits, memory storing program instructions executable to implement the operation, etc. Reciting that a unit/component is "configured to" perform one or more tasks is expressly intended not to invoke 35 U.S.C. § 112, paragraph (f), for that unit/component. Additionally, "configured to" can include generic structure that is manipulated by software or firmware to operate in manner that is capable of performing the task(s) at issue.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

It will also be understood that, although the terms 1, 2, N, etc. may be used herein to describe various elements, these elements should not be limited by these terms. These terms are only used to distinguish one element from another. For example, a component with the term 1 could be termed a second component, and, similarly, a component with the term 2 could be termed a first component, without departing from the scope of the present invention. The first components and the second component are both components, but they are not the same components. Also, the term N indicates that an Nth amount of the elements may or may not exist depending on the embodiments.

DETAILED DESCRIPTION OF EMBODIMENTS

Cloud-based threat detection services may use telemetry data about resources provisioned in customer accounts in order to recognize threats to the customer accounts. For example, abnormal activity, such as resulting from an attack, may be discernable from telemetry data and may be useful to identify and/or mitigate the attack. Telemetry data may be collected in a variety of manners, such as passively or actively. For example, passive telemetry data collection may involve collecting telemetry data received from other services of a provider network that support customer accounts, without directly receiving telemetry data from the resources provisioned in the customer account. As an example, telemetry data may be received from a network load balancer that supports multiple customer accounts and this telemetry data may be useful in inferring network activity, such as due to an attack, that is directed at resources of a particular customer account. However, such passive telemetry data collection does not involve collecting telemetry data directly from the resources provisioned in the customer account. On the other hand, active telemetry data collection requires customer permission to collect data from inside a customer-controlled environment and is also susceptible to manipulation by attackers who may have taken control of resources in the customer account. Additionally, configuration changes may be required on the customer resources in order to implement active telemetry collection.

In some embodiments, in order to receive the telemetry data from instances that support customer-controlled resources, such as containers, agents either from the threat detection service or a $3^{rd}$ party may be installed on the instances with the customer-controlled resources, such as customer containers. Also, in some embodiments, the underlying computing infrastructure upon which the instances are implemented may be provided by a third-party, such as at a facility of a customer of the provider network. For example, in the case of containers that implement customer code execution wherein the code execution is relatively short-lived, configuring the underlying computing resources to perform active telemetry collection each time a customer code execution job is invoked may be impractical. As an alternative, an agent included on an instance with a customer container may perform active telemetry data collection and send the collected telemetry data to a threat-detection service. However, since the agent resides on the instance with the customer-controlled container, the agent, after installation, is beyond the control of the threat-detection service and is susceptible to manipulation, for example by nefarious actors. Thus, a system to verify the agent used to perform telemetry data collection without requiring customer configuration is needed. In some embodiments, the telemetry data may include telemetry information for the customer-controlled container and/or telemetry information for the instance implementing the customer-controlled container.

To address these issues and/or other issues, in some embodiments, an agent verification system may verify an agent that requests to send telemetry data to a threat detection service and then enable the threat detection service to receive the telemetry data, in response to authenticating the agent. For example, the agent verification system may receive a request, from an agent deployed adjacent to a customer-controlled software container, to send telemetry data to a cloud-based threat detection service. The request may comprise an instance ID of a virtualized computing instance upon which the customer-controlled software container is executing, and may additionally include a token and/or a connection ID of a known connection endpoint that routed the request to send telemetry data (e.g., telemetry communication request).

The agent verification system may confirm an account associated with the instance ID is authorized to provide the telemetry data to the cloud-based threat detection service. To verify the instance ID, the agent verification system may confirm that the instance ID matches an instance ID of a virtualized computing instance known to be allocated to support the customer-controlled software container.

To verify the token, the agent verification system may confirm that the token is a type of token issued by a token provider known to be associated with the instance ID. A token provider may include $3^{rd}$ party providers that the agent verification system may use to verify the agent. The agent verification system may then confirm with an authorization service for the token provider that the agent is an authentic agent based on verifying the token included in the request.

To verify the connection ID, the agent verification system may confirm the connection ID of the known connection endpoint matches a connection ID for the virtualized computing instance of the instance ID. The agent verification system, in response to verifying the instance ID, token, and connection ID, may accept the request to send the telemetry data. The cloud-based threat detection service may then be enabled to receive the telemetry data.

In some embodiments, the agent verification system may receive a request to implement telemetry data collection for a plurality of accounts. In such embodiments, additional customer-controlled software containers execute on additional virtualized computing instances associated with the plurality of accounts. The agent verification system may then automatically enroll the additional virtualized computing instances associated with the plurality of accounts to be eligible to send telemetry data, if accepted by the agent verification system, to the cloud-based threat detection service. For example, a company with multiple employees may request to implement telemetry data collection for multiple accounts for each of the multiple employees. This may avoid the cumbersome process of having each account separately be updated to allow telemetry data collection. Thus, in some embodiments, wherein multiple accounts are associated with a same customer, instances associated with different accounts may be implemented in a shared isolated virtual network and share a connection ID. In such circumstances, the agent verification system is configured to resolve the connection ID as belonging to a customer associated with the instance ID, even if the instance ID and the connection ID correspond to different accounts of the same customer.

Figure 1:
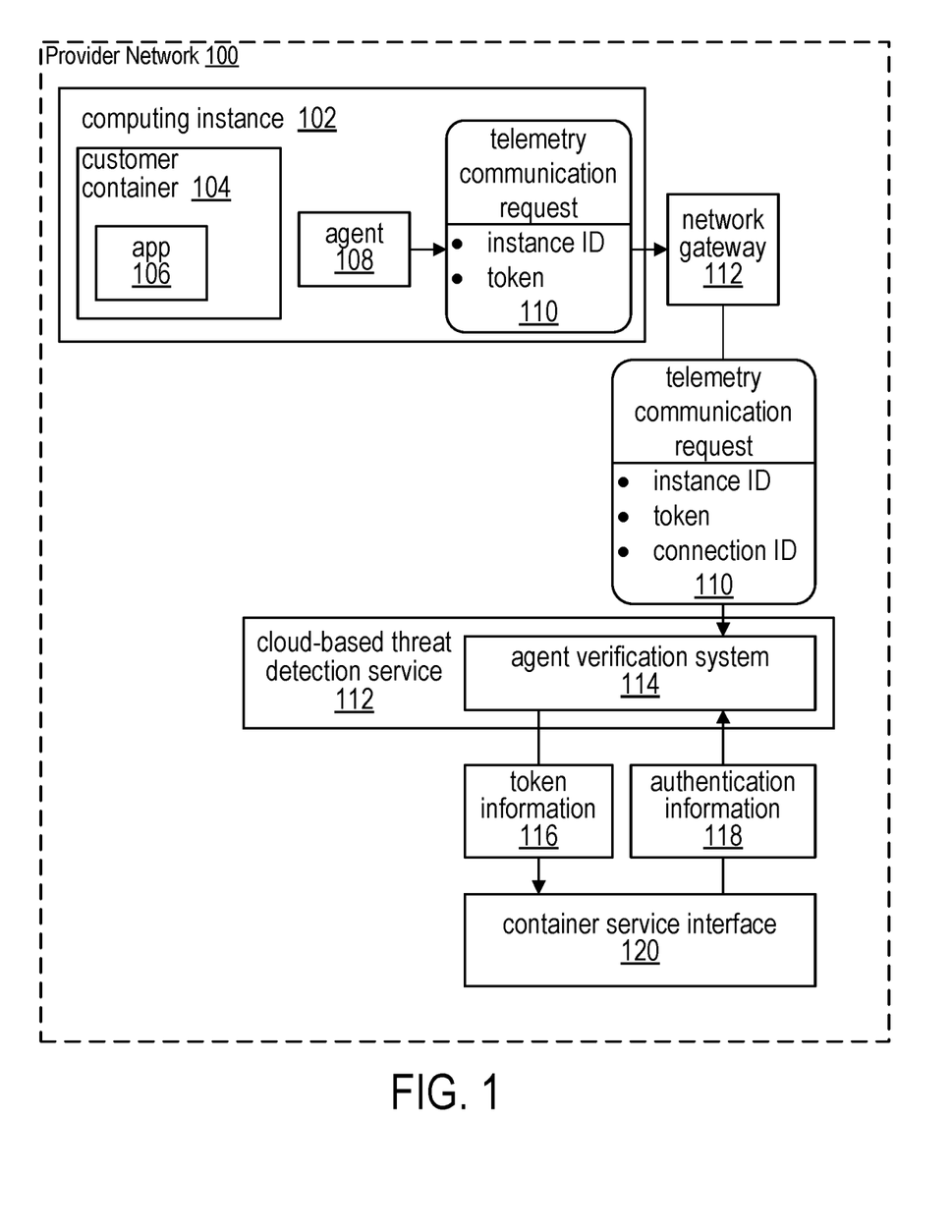
FIG. 1 is a block diagram illustrating an agent verification system for a cloud-based threat detection service, wherein the agent verification system receives a request to provide telemetry data to the cloud-based threat detection service from an agent on an instance with a customer-controlled container, and wherein the agent verification system verifies the agent using an instance ID, token, and/or connection ID in the request, according to some embodiments.

FIG. 1 is a block diagram illustrating an agent verification system for a cloud-based threat detection service, wherein the agent verification system receives a request to provide telemetry data to the cloud-based threat detection service from an agent implemented on an instance with a customer-controlled container, and wherein the agent verification system verifies the agent adjacent to the customer-controlled container using the instance ID, token, and connection ID in the request, according to some embodiments.

In some embodiments, agent verification is performed in a provider network 100, such as by an agent verification system 114 of a cloud-based threat detection service 112 and may resemble embodiments as shown in FIG. 1. In some embodiments, computing instance 102 may include a customer container 104. In some embodiments, the customer-controlled container may be formatted using a Kubernetes container format or other suitable software container format. The customer container 104 may include an application 106 and may be implemented on computing instance 102 along with an agent 108, wherein the agent 108 is provided by or otherwise configured to communicate with the cloud-based threat detection service 112. The application 106 and/or computing instance 102 may provide telemetry data to the agent 108. The agent 108 may then send the collected telemetry data to the cloud-based threat detection service 112. In order to initiate telemetry communication, the agent 108 may send a telemetry communication request 110 to a network gateway 112, wherein the network gateway 112 is a gateway for a network or sub-network that includes the computing instance 102.

Figure 4:
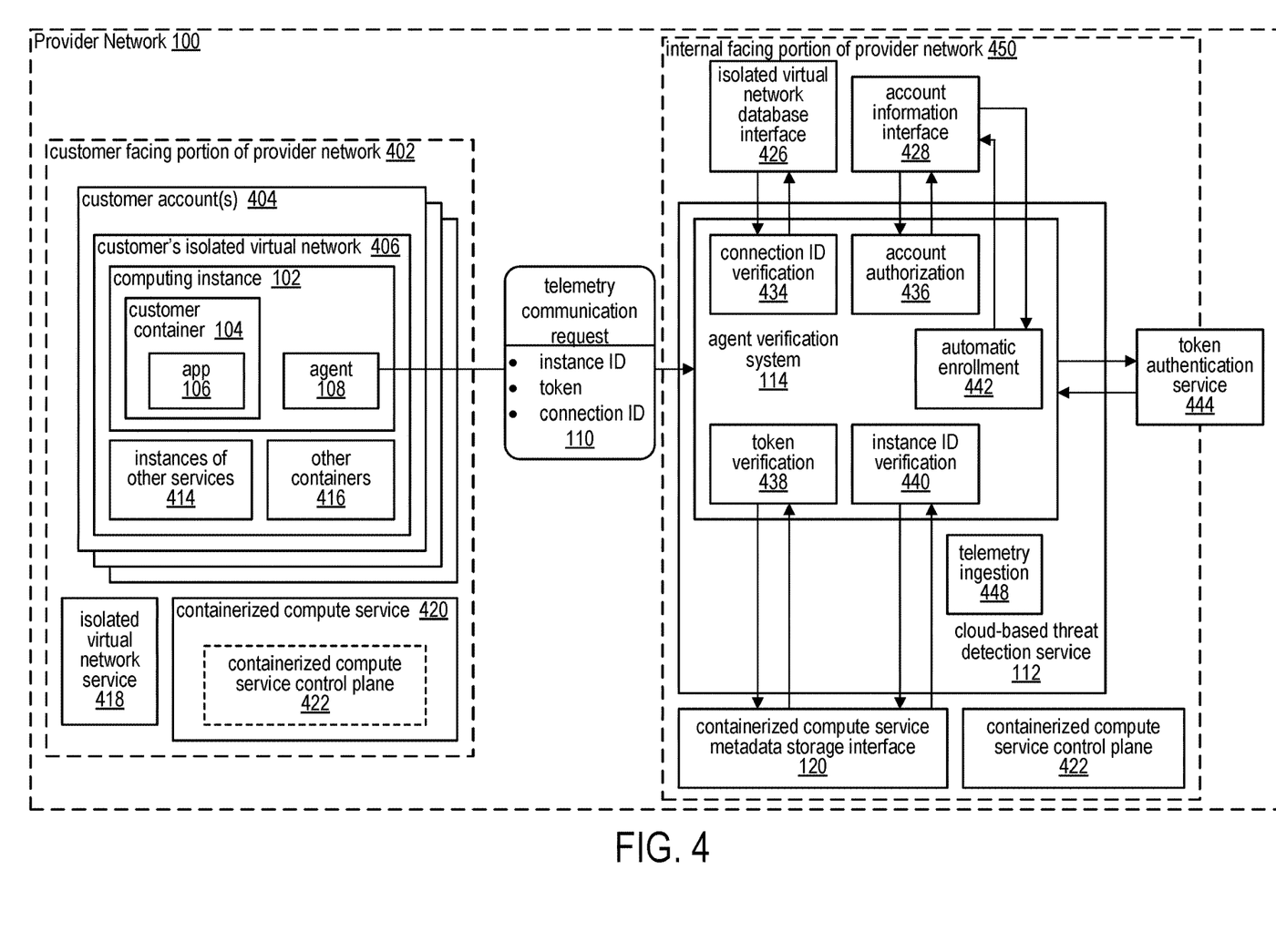
FIG. 4 is a block diagram illustrating an agent verification system for a cloud-based threat detection service, wherein the agent verification system receives a request to provide telemetry data to the cloud-based threat detection service from an agent on an instance with a customer container, and wherein the agent verification system verifies the agent using an isolated virtual network database interface, an account information interface, a containerized compute service metadata storage interface, and a token authentication service, according to some embodiments.

The telemetry communication request 110 may be a request to send telemetry data to the cloud-based threat detection service 112. The telemetry communication request 110 may include an instance ID and a token. In some embodiments, the token may be a JSON Web Token. The network gateway 112 may route the request to the agent verification system 114 and may add a connection ID when providing the request. In some embodiments, the network gateway 112 may be an endpoint of an isolated virtual network, such as may be provided by isolated virtual network service 418, as shown in FIG. 4, wherein the isolated virtual network is allocated to an account associated with the instance ID in the telemetry communication request 110. The connection ID may indicate where the request came from. During the process for verifying the agent, information token information 116 may be provided to a customer service interface 120 to prompt the container service interface 120 to send authentication information 118 regarding the token back to the agent verification system 114.

Figure 2:
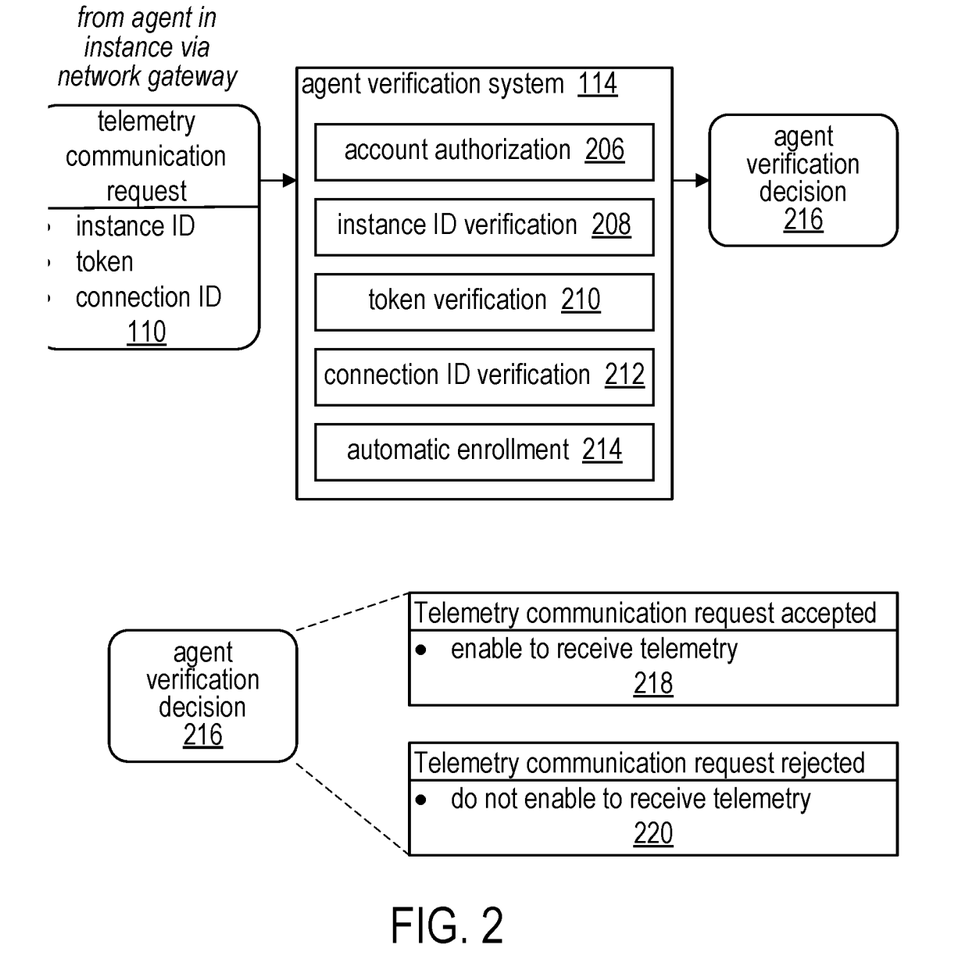
FIG. 2 is a block diagram illustrating an agent verification system, wherein the agent verification system receives a telemetry communication request that includes an instance ID, a token, and/or a connection ID, and wherein the agent verification system verifies the telemetry communication request and outputs an agent verification decision either accepting or rejecting the telemetry communication request based on the identifying information included with the telemetry communication request, according to some embodiments.

FIG. 2 is a block diagram illustrating an agent verification system, wherein the agent verification system receives a telemetry communication request that includes an instance ID, a token, and a connection ID, and wherein the agent verification system verifies the telemetry communication request and outputs an agent verification decision either accepting or rejecting the telemetry communication request, according to some embodiments.

Some embodiments, such as shown in FIG. 1 may include further features such as shown in FIG. 2. In some embodiments, to verify the agent associated with the telemetry communication request 110, the agent verification system 114 may include account authorization 206, instance ID verification 208, token verification 210, connection ID verification 212, and automatic enrollment 214. In different embodiments the verifications and authorizations may be performed in different orders than described. The telemetry communication request 110 received from an agent in an instance via a network gateway may be received by the agent verification system 114.

The account authorization 206 may be configured to confirm an account associated with the instance ID in the telemetry communication request 110 is authorized to provide telemetry data to the cloud-based threat detection service 112, such as shown in FIG. 1. The instance ID verification 208 may be configured to confirm that the instance ID from the telemetry communication request 110 matches an instance ID of an instance known to be allocated to support the customer-controlled container the agent is associated with, such as the customer container 104 shown in FIG. 1.

The token verification 210 may be configured to confirm the token from the telemetry communication request 110 is a type of token issued by a token provider known to be associated with the instance ID from the telemetry communication request 110. The token verification 210 may also be configured to confirm with an authorization service for the token provider that the agent that sent the telemetry communication request 110 is an authentic agent based on verifying the token included in the telemetry communication request 110.

The connection ID verification 212 may be configured to confirm the connection ID from the telemetry communication request 110 matches a connection ID for the virtualized computing instance of the instance ID from the telemetry communication request 110, such as instance 102 in FIG. 1. In some embodiments, the agent verification system 114 may receive a request to implement telemetry data collection for a plurality of accounts. In such embodiments, additional customer-controlled software containers may be executing on additional virtualized computing instances associated with the plurality of accounts. The automatic enrollment 214 may automatically enroll the additional virtualized computing instances associated with the plurality of accounts to be eligible to send telemetry data, if accepted by the agent verification system 114, to the cloud-based threat detection service 112. In some embodiments, enrolling the additional virtualized computing instances may be performed by granting authorization to provide telemetry data to agents deployed (or to be deployed) on the additional virtualized computing instances.

In some embodiments, after determining the verification status of the agent, an agent verification decision 216 may be outputted by the agent verification system 114. If the agent is successfully verified, the agent verification decision 216 may be a decision accepting the telemetry communication request 218. The accepted request decision 218 may include instructions to enable the cloud-based threat detection service 112, such as shown in FIG. 1, to receive telemetry data. In some embodiments, if the agent fails to be verified, the agent verification decision 216 may be a decision rejecting the telemetry communication request 220. The rejected request decision 220 may include instructions to not enable the cloud-based threat detection service 112, such as in FIG. 1, to receive telemetry.

Figure 3:
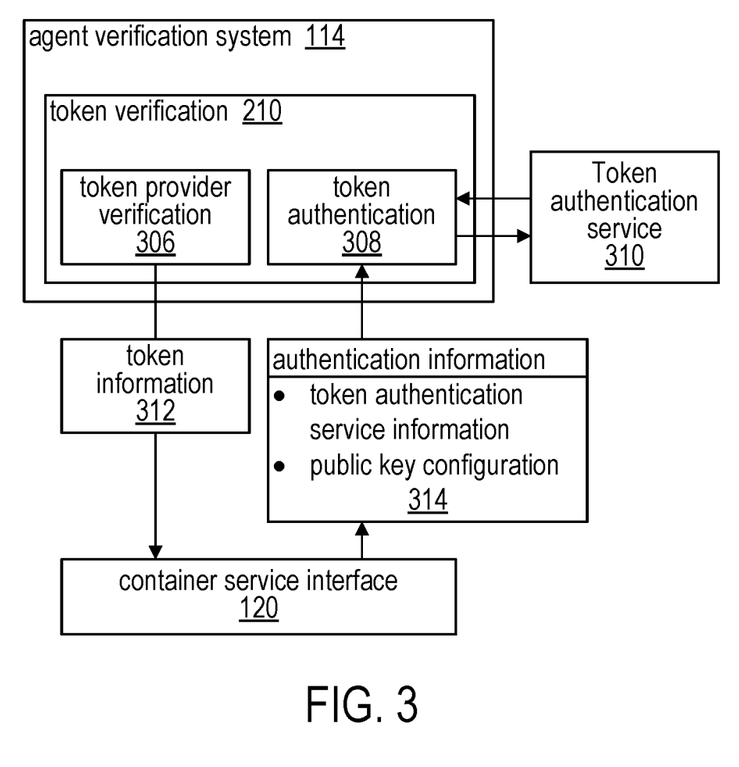
FIG. 3 is a block diagram illustrating an agent verification system that may implement token verification to verify a token, received with a telemetry communication request, using a container service interface and a token authentication service, according to some embodiments.

FIG. 3 is a block diagram illustrating an agent verification system that may implement token verification to verify the token using a container service interface and a token authentication service, according to some embodiments.

Some embodiments, such as shown in FIGS. 1-2, may include further features such as shown in FIG. 3. In some embodiments, token verification 210 may verify the token during an agent verification process as shown in FIG. 3.

Token provider verification 306 may verify the token from a request, such as telemetry communication request 110, is a type of token issued by a token provider known to be associated with an instance ID in the request. Token information 312 may then be provided to a container service interface 120. In response, the container service interface 120 may provide authentication information 314 to token authentication 308.

In some embodiments, the token provider may use an OpenID Connect protocol for verifying and/or providing tokens. In cases where the token is a JSON Web Token, the authentication information 314 may include token authentication service information, such as a JSON Web Key Set URL (JWKS), and a public key configuration. The authentication information 314 may be used to validate the token. For example, the token authentication service information may identify or otherwise provide a method of contacting an authentication service, such as token authentication service 310, and the public key configuration may be used by the authentication service, such as token authentication service 310 (or may be used by token verification 210 in conjunction with authentication service 310), to verify the token included in telemetry communication request 110 is indicative of a token provided by an authentic agent. For example, the token authentication module 308 may then confirm with an authentication service, such as token authentication service 310, that the agent that sent the request is an authentic agent based on verifying the token included in the request.

FIG. 4 is a block diagram illustrating an agent verification system for a cloud-based threat detection service, wherein the agent verification system receives a request to provide telemetry data to the cloud-based threat detection service from an agent in a customer worker service, and wherein the agent verification system verifies the agent using an isolated virtual network database interface, an account information interface, a containerized compute service metadata storage interface, and a token authentication service, according to some embodiments.

For some embodiments, such as shown in FIGS. 1-3, a provider network 100 may include further features, such as shown in FIG. 4. In some embodiments, a telemetry communication request 110 to send telemetry data may be provided to an agent verification service 114, which may then verify an agent 108 that sent the telemetry communication request 110, as shown in FIG. 4. A customer facing portion of a provider network 402 may include customer account(s) 404, an isolated virtual network service 418, and a containerized compute service 420. The containerized compute service 420 may include a containerized compute service control plane 422. The customer account(s) 404 may include a customer's isolated virtual network 406. The customer's isolated virtual network 406 may include an instance 102, instances of other services 414, and/or other containers 416. The instance 102 may include a customer container 104 that includes an app 106 and the instance 102 may also implement an agent 108. In some embodiments, an agent may be in a separate container in the instance 102. The agent may also perform as an agent for multiple containers in the instance 102. In some embodiments, the app 106 may include customer-deployed software that may be executed directly on the instance 102 instead of the customer container 104.

In some embodiments, the agent 108 may send a telemetry communication request 110, via a network gateway, such as shown in FIG. 1, to the agent verification system 114 in an internal facing portion of provider 450. In some embodiments the network gateway may be configured by the isolated virtual network service 418. The account authorization 436 may access the account information interface 428 to confirm the account associated with the instance ID in the telemetry communication request 110 is authorized to provide telemetry data to the cloud-based threat detection service 112. In some embodiments, the connection ID verification 434 may access the isolated virtual network database interface 426 to confirm that the connection ID in the telemetry communication request 110 matches a connection ID for the customer's isolated virtual network 406.

The token verification 438 may access a containerized compute service metadata storage interface 120 and the token authentication service 444 to confirm that the token in the telemetry communication request 110 is a type of token issued by a token provider known to be associated with the instance ID in the telemetry communication request 110 and confirm that the agent 108 is an authentic agent based on verifying the token. The instance ID verification 440 may access the containerized compute service metadata storage interface 120 to confirm that the instance ID in the telemetry communication request 110 matches an instance ID of a customer's isolated virtual network 406 known to be allocated to support the instance 102.

In some embodiments, a request may be received to implement telemetry data collection for a plurality of accounts. The automatic enrollment 442 may access the account information interface 428 to automatically enroll additional instances and/or agents associated with the plurality of accounts to be eligible to send telemetry data, if accepted by the agent verification system 114, to the cloud-based threat detection service 112. The cloud-based threat detection service 112 may also include telemetry ingestion 438 to receive the accepted telemetry data.

Figure 5:
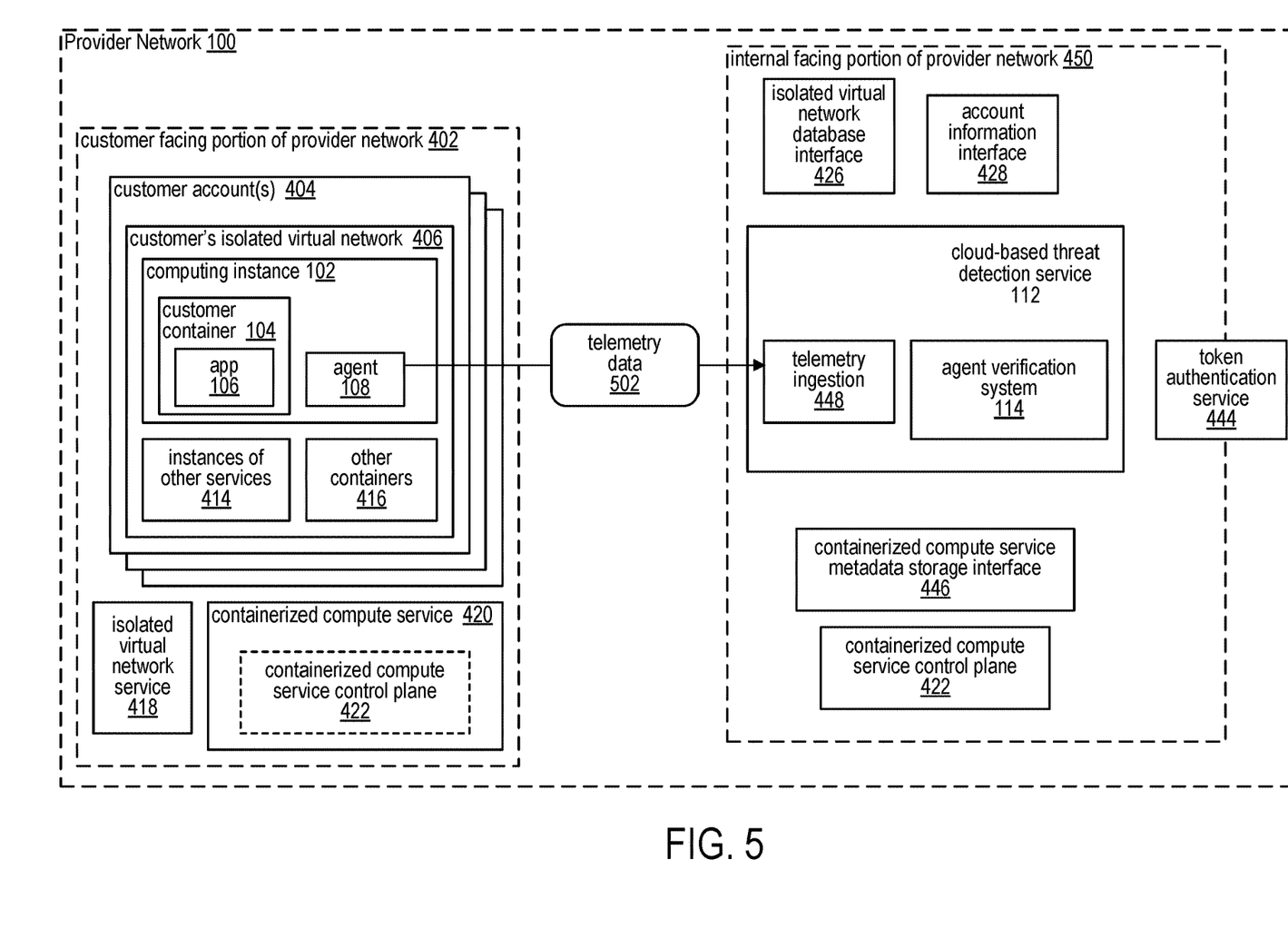
FIG. 5 is a block diagram illustrating a cloud-based threat detection service, wherein telemetry data from an agent on the instance with the customer container is received by a telemetry ingestion interface of the cloud-based threat detection service after the agent has been verified, according to some embodiments.

FIG. 5 is a block diagram illustrating a cloud-based threat detection service, wherein telemetry data from an agent of the customer worker server is received by telemetry ingestion of the cloud-based threat detection service after the agent has been verified, according to some embodiments.

Some embodiments, such as shown in FIGS. 1-4 may include further features, such as shown in FIG. 5. In some embodiments, once the agent verification system 114 accepts a telemetry communication request 110 from the agent 108 to send telemetry data 502 such as shown in FIG. 4, the telemetry data 502 may be provided to telemetry ingestion 448 in the cloud-based threat detection service 112.

Figure 6:
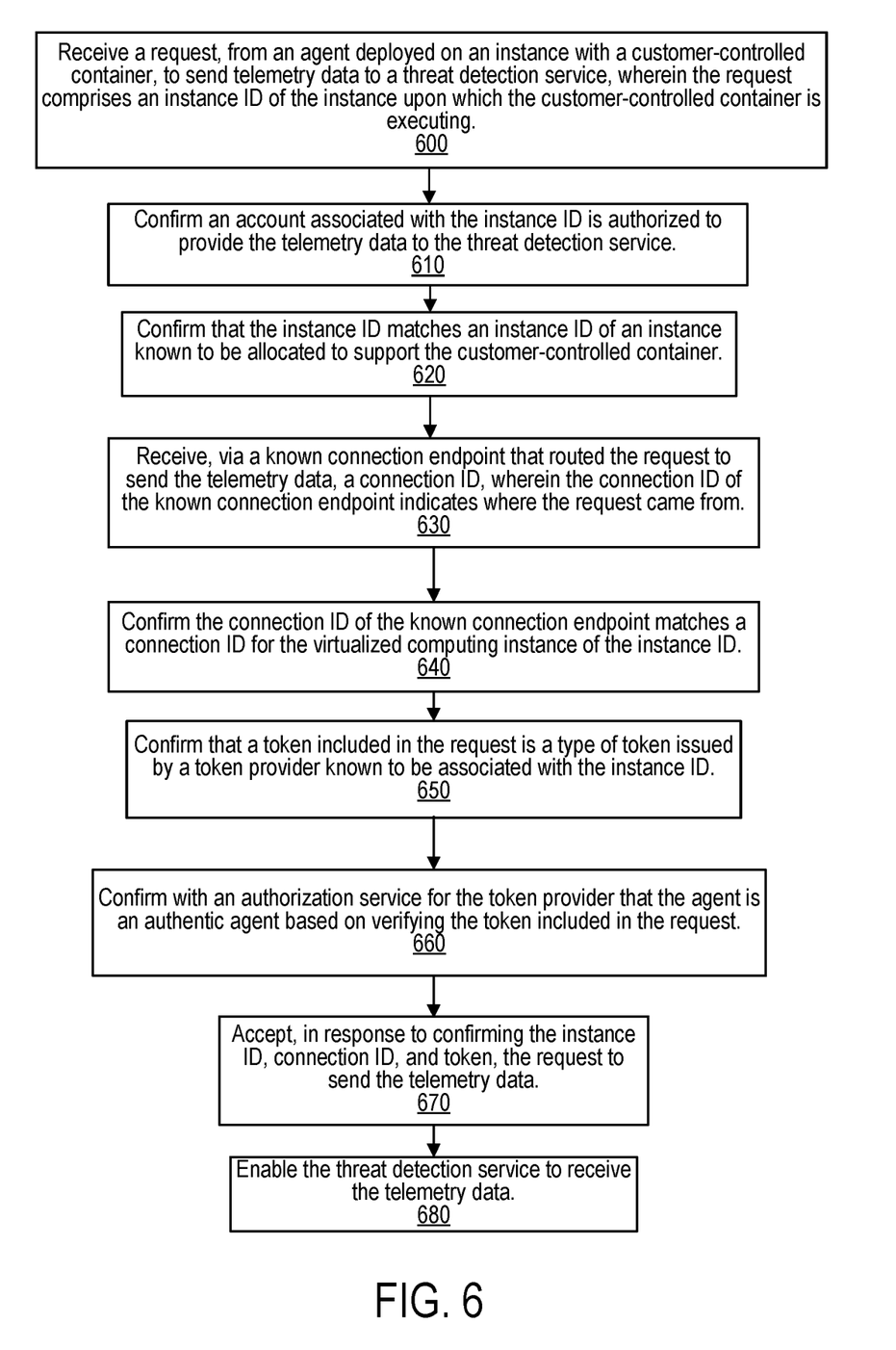
FIG. 6 is a flow diagram illustrating a process of verifying an agent deployed on an instance with a customer-controlled container, wherein the verification is performed in response to receiving a request to send telemetry data to a threat detection service from the agent, and wherein the verification results in accepting, in response to confirming the instance ID, connection ID, and token, the request; and enabling the threat detection service to receive the telemetry data, according to some embodiments.

FIG. 6 is a flow diagram illustrating a process of verifying an agent deployed along with a customer-controlled container, in response to receiving a request to send telemetry data to a threat detection service from the agent; accepting, in response to confirming the instance ID, connection ID, and token, the request; and enabling the threat detection service to receive the telemetry data, according to some embodiments.

In some embodiments, a process for verifying an agent in response to receiving a request to send telemetry data is shown in FIG. 6. In block 600, a request may be received, from an agent deployed along with a customer-controlled container, to send telemetry data to a threat detection service, wherein the request may comprise an instance ID of an instance upon which the customer-controlled container is executing. In block 610, an account associated with the instance ID may be confirmed to be authorized to provide the telemetry data to the threat detection service. In block 620, the instance ID may be confirmed to match an instance ID of an instance known to be allocated to support the customer-controlled container.

In block 630, a connection ID may be received, via a known connection endpoint that routed the request to send the telemetry data, wherein the connection ID of the known connection endpoint indicates where the request came from. In block 640, the connection ID of the known connection endpoint may be confirmed to match a connection ID for a connection (such as network gateway) provided for use by the virtualized computing instance of the instance ID.

In block 650, a token included in the request may be confirmed to be a type of token issued by a token provider known to be associated with the instance ID. In block 660, the agent may be confirmed with an authorization service for the token provider to be an authentic agent based on verifying the token included in the request. In block 670, the request to send the telemetry data may be accepted, in response to confirming the instance ID, connection ID, and token. In block 680, the threat detection service may be enabled to receive the telemetry data. The order of the process for verifying an agent in response to receiving a request to receive telemetry data may be different than the embodiment shown in FIG. 6. For example, the token verification in blocks 650-660 may be performed before blocks 620-640.

Figure 7:
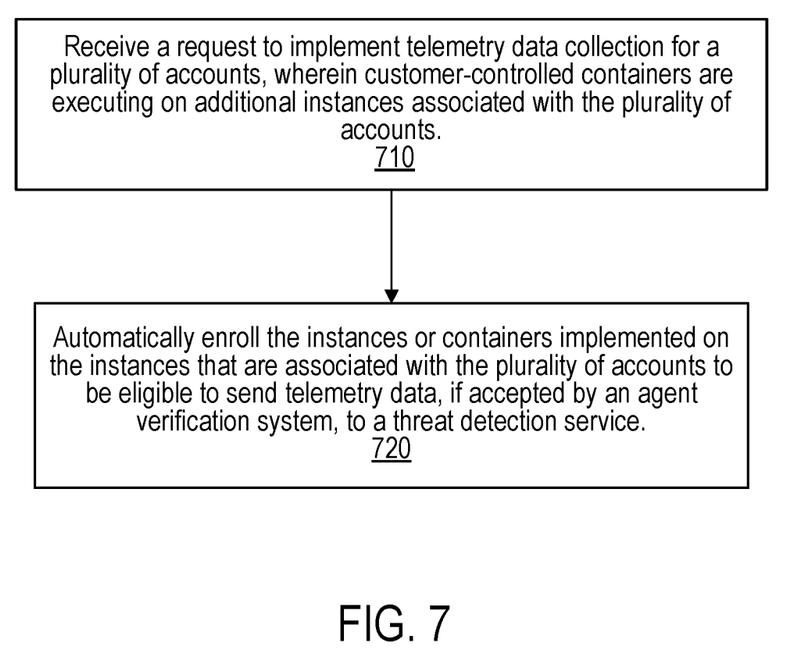
FIG. 7 is a flow diagram illustrating a process of receiving a request to implement telemetry data collection for a plurality of accounts and automatically enrolling the plurality of accounts for telemetry data collection, if accepted by an agent verification system, according to some embodiments.

FIG. 7 is a flow diagram illustrating a process of receiving a request to implement telemetry data collection for a plurality of accounts and automatically enrolling the plurality of accounts for telemetry data collection, if accepted by an agent verification system, according to some embodiments.

In some embodiments, a process of implementing telemetry data collection for a plurality of accounts is shown in FIG. 7. In block 710, a request may be received to implement telemetry data collection for a plurality of accounts, wherein additional customer-controlled containers may be executing on additional instances associated with the plurality of accounts. In block 720, the additional instances associated with the plurality of accounts may be automatically enrolled to be eligible to send telemetry data, if accepted by an agent verification system, to a threat detection service.

Figure 8:
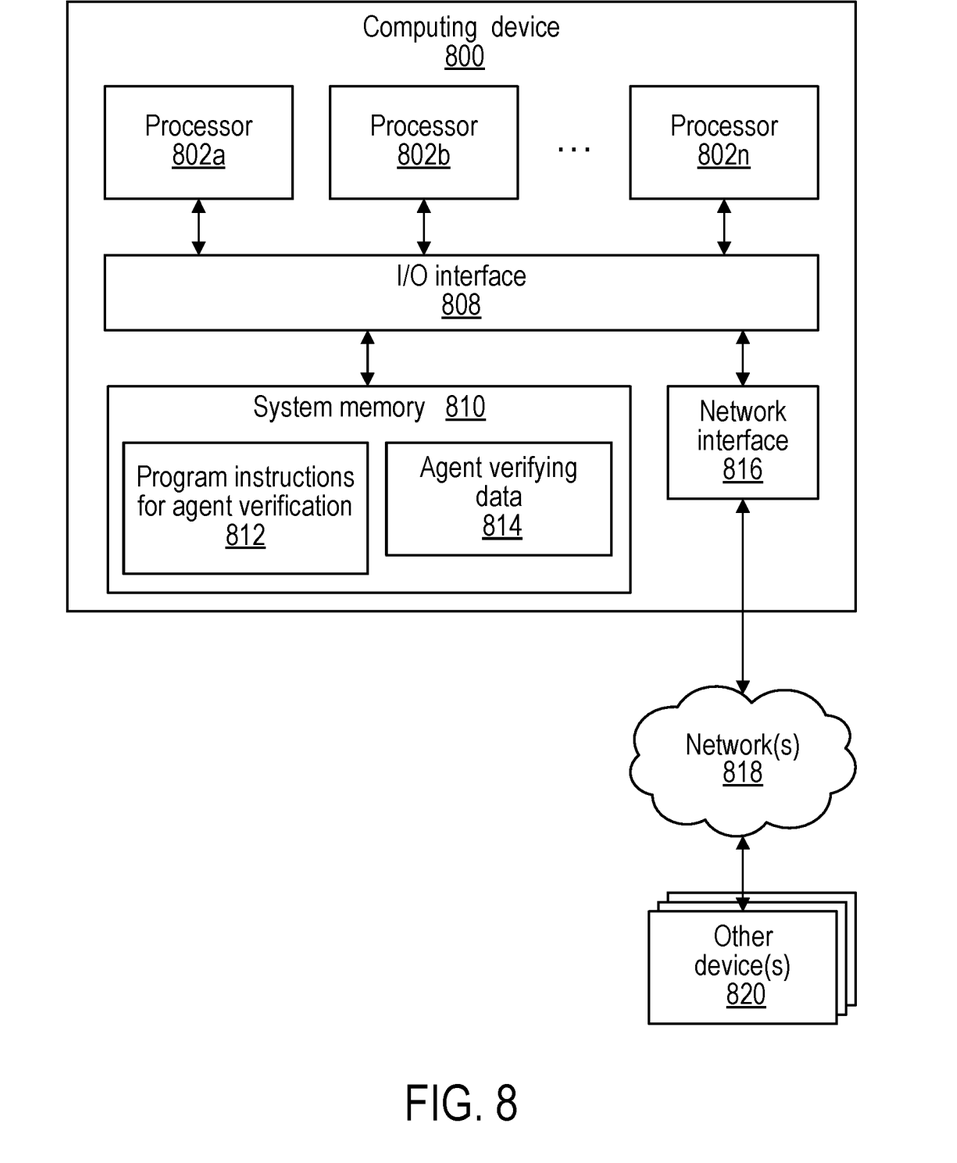
FIG. 8 is a block diagram illustrating an example computer system that implements portions of agent verifying described herein, according to some embodiments.

FIG. 8 is a block diagram illustrating an example computer system that implements portions of agent verifying described herein, according to some embodiments.

In at least some embodiments, a server that implements a portion or all of one or more of the technologies described herein, including the techniques for performing agent verifying may include a general-purpose computer system that includes or is configured to access one or more computer-accessible media. FIG. 8 illustrates such a general-purpose computing device 800. In the illustrated embodiment, computing device 800 includes one or more processors 802 coupled to a system memory 810 (which may comprise both non-volatile and volatile memory modules) via an input/output (I/O) interface 808. Computing device 800 further includes a network interface 816 coupled to I/O interface 808.

In various embodiments, computing device 800 may be a uniprocessor system including one processor 802, or a multiprocessor system including several processors 802 (e.g., two, four, eight, or another suitable number). Processors 802 may be any suitable processors capable of executing instructions. For example, in various embodiments, processors 802 may be general-purpose or embedded processors implementing any of a variety of instruction set architectures (ISAs), such as ARM, the x86, PowerPC, or MIPS ISAs, or any other suitable ISA. In multiprocessor systems, each of processors 1102 may commonly, but not necessarily, implement the same ISA. In some implementations, graphics processing units (GPUs) may be used instead of, or in addition to, conventional processors.

System memory 810 may be configured to store instructions and data accessible by processor(s) 802. In at least some embodiments, the system memory 810 may comprise both volatile and non-volatile portions; in other embodiments, only volatile memory may be used. In various embodiments, the volatile portion of system memory 810 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery).

In various embodiments, memristor based resistive random-access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 810 as program instructions for agent verification 812 and agent verifying data 814.

For example, program instructions for agent verification 812 may include program instructions for implementing an agent verification service, such as agent verification system 114 illustrated in FIG. 1. Also, in some embodiments, program instructions for agent verification 812 may include program instructions for implementing components of an agent verification system, such as account authorization 206, instance ID verification 208, token verification 210, connection ID verification 212, and automatic enrollment 214, etc. as shown in FIG. 2.

In one embodiment, I/O interface 808 may be configured to coordinate I/O traffic between processor 802, system memory 810, and any peripheral devices in the device, including network interface 816 or other peripheral interfaces such as various types of persistent and/or volatile storage devices. In some embodiments, I/O interface 808 may perform any necessary protocol, timing, or other data transformations to convert data signals from one component (e.g., system memory 810) into a format suitable for use by another component (e.g., processor 802).

In some embodiments, I/O interface 808 may include support for devices attached through various types of peripheral buses, such as a variant of the Peripheral Component Interconnect (PCI) bus standard or the Universal Serial Bus (USB) standard, for example. In some embodiments, the function of I/O interface 808 may be split into two or more separate components, such as a north bridge and a south bridge, for example. Also, in some embodiments some or all of the functionality of I/O interface 808, such as an interface to system memory 810, may be incorporated directly into processor 802.

Network interface 816 may be configured to allow data to be exchanged between computing device 800 and other devices 820 attached to a network or networks 818, such as other computer systems or devices as illustrated in FIG. 1 through FIG. 7, for example. Additionally, network interface 816 may support communication via telecommunications/ telephony networks such as analog voice networks or digital fiber communications networks, via storage area networks such as Fibre Channel SANs, or via any other suitable type of network and/or protocol.

In some embodiments, system memory 810 may be one embodiment of a computer-accessible medium configured to store program instructions and data as described above for FIG. 1 through FIG. 7 for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computing device 800 via I/O interface 808. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 800 as system memory 810 or another type of memory.

In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 816.

Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

The various methods as illustrated in the figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention encompasses all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement an agent verification system for a cloud-based threat detection service, the agent verification system configured to:
   receive a request, from an agent deployed on a virtualized computing instance with a customer-controlled software container, to send telemetry data to the cloud-based threat detection service, wherein the request comprises an instance ID of the virtualized computing instance upon which the customer-controlled software container is executing;
   confirm that the instance ID matches an instance ID of a virtualized computing instance known to be allocated to support the customer-controlled software container;
   accept, in response to confirming the instance ID, the request to send the telemetry data; and
   enable the cloud-based threat detection service to receive the telemetry data.

2. The system of claim 1, wherein the agent verification system is further configured to:
   confirm that a token included in the request is a type of token issued by a token provider known to be associated with the instance ID; and
   confirm with an authorization service for the token provider that the agent is an authentic agent based on verifying the token included in the request.

3. The system of claim 1, wherein the agent verification system is further configured to:
   receive, via a known connection endpoint that routed the request to send the telemetry data, a connection ID, wherein the connection ID of the known connection endpoint indicates where the request came from; and
   confirm the connection ID of the known connection endpoint matches a connection ID for the virtualized computing instance of the instance ID.

4. The system of claim 1, wherein the agent verification system is further configured to:
   confirm an account associated with the instance ID is authorized to provide the telemetry data to the cloud-based threat detection service.

5. The system of claim 1, wherein the agent verification system is further configured to:
   receive a request to implement telemetry data collection for a plurality of accounts, wherein additional customer-controlled software containers are executing on additional virtualized computing instances associated with the plurality of accounts; and
   automatically enroll the additional virtualized computing instances associated with the plurality of accounts to be eligible to send telemetry data, if accepted by the agent verification system, to the cloud-based threat detection service.

6. One or more non-transitory, computer-readable storage media, storing program instructions that when executed on or across one or more computing devices cause the one or more computing devices to:
   receive a request, from an agent deployed on an instance with a customer-controlled container, to send telemetry data to a threat detection service, wherein the request comprises an instance ID of the instance upon which the customer-controlled container is executing;
   confirm that the instance ID matches an instance ID of an instance known to be allocated to support the customer-controlled container;
   accept, in response to confirming the instance ID, the request to send the telemetry data; and
   enable the threat detection service to receive the telemetry data.

7. The one or more non-transitory, computer-readable storage media of claim 6, wherein the instructions when executed on or across the one or more computing devices, cause the one or more computing devices to:
   confirm that a token included in the request is a type of token issued by a token provider known to be associated with the instance ID; and confirm with an authorization service for the token provider that the agent is an authentic agent based on verifying the token included in the request.

8. The one or more non-transitory, computer-readable storage media of claim 7, wherein the token is a JSON Web Token.

9. The one or more non-transitory, computer-readable storage media of claim 7, wherein the token provider uses an OpenID Connect protocol to verify and/or provide the token.

10. The one or more non-transitory, computer-readable storage media of claim 6, wherein the instructions when executed on or across the one or more computing devices, cause the one or more computing devices to:
receive, via a known connection endpoint that routed the request to send the telemetry data, a connection ID, wherein the connection ID of the known connection endpoint indicates where the request came from; and
confirm the connection ID of the known connection endpoint matches a connection ID for the instance of the instance ID.

11. The one or more non-transitory, computer-readable storage media of claim 10, wherein the known connection endpoint is an endpoint of an isolated virtual network associated with an account associated with the instance ID.

12. The one or more non-transitory, computer-readable storage media of claim 6, wherein the instructions when executed on or across the one or more computing devices, cause the one or more computing devices to:
confirm an account associated with the instance ID is authorized to provide the telemetry data to the threat detection service.

13. The one or more non-transitory, computer-readable storage media of claim 6, wherein the instructions are used to implement an agent verification system, and wherein the instructions when executed on or across the one or more computing devices, cause the one or more computing devices to:
receive a request to implement telemetry data collection for a plurality of accounts, wherein additional customer-controlled containers are executing on additional instances associated with the plurality of accounts; and
automatically enroll the additional instances associated with the plurality of accounts to be eligible to send telemetry data, if accepted by the agent verification system, to the threat detection service.

14. The one or more non-transitory, computer-readable storage media of claim 6, wherein the customer-controlled container is formatted using a Kubernetes container format.

15. A method, comprising:
receiving a request, from an agent deployed on an instance with a customer-controlled container, to send telemetry data to a threat detection service, wherein the request comprises an instance ID of the instance upon which the customer-controlled container is executing;
confirming that the instance ID matches an instance ID of an instance known to be allocated to support the customer-controlled container;
accepting, in response to confirming the instance ID, the request to send the telemetry data; and
enabling the threat detection service to receive the telemetry data.

16. The method of claim 15, comprising:
confirming that a token included in the request is a type of token issued by a token provider known to be associated with the instance ID; and
confirming with an authorization service for the token provider that the agent is an authentic agent based on verifying the token included in the request.

17. The method of claim 15, comprising:
receiving, via a known connection endpoint that routed the request to send the telemetry data, a connection ID, wherein the connection ID of the known connection endpoint indicates where the request came from; and
confirming the connection ID of the known connection endpoint matches a connection ID for the instance of the instance ID.

18. The method of claim 15, comprising:
confirming an account associated with the instance ID is authorized to provide the telemetry data to the threat detection service.

19. The method of claim 15, further comprising:
receiving a request to implement telemetry data collection for a plurality of accounts, wherein additional customer-controlled containers are executing on additional instances associated with the plurality of accounts; and
automatically enrolling the additional instances associated with the plurality of accounts to be eligible to send telemetry data, if accepted by an agent verification system, to the threat detection service, wherein the agent verification system performs said receiving, said confirming, said accepting, and said enabling to verify the agent and other agents associated with the plurality of the accounts for sending the telemetry data to the threat detection service.

20. The method of claim 15, wherein the customer-controlled container is formatted using a Kubernetes container format.

* * * * *